United States Patent

[11] 3,603,435

| [72] | Inventors | Wallace C. Buzzard |
| | | 5901 Lancer Court, Dayton, Ohio 45424; |
| | | Joseph E. Krysiak, 510 Wilmington Ave., |
| | | Dayton, Ohio 45420 |
| [21] | Appl. No. | 866,930 |
| [22] | Filed | Oct. 16, 1969 |
| [45] | Patented | Sept. 7, 1971 |

[54] AIR COOLED DISC BRAKE ROTOR
1 Claim, 8 Drawing Figs.

[52] U.S. Cl. .................................................... 188/218 XL,
188/71.6, 188/264 AA, 192/107 R, 192/113 A
[51] Int. Cl. ............................................................ F16d 65/12
[50] Field of Search.......................................... 188/71.6,
73.1, 73.2, 218, 264 AA; 192/107 R, 113 A, 107

[56] References Cited
UNITED STATES PATENTS
| 1,882,873 | 10/1932 | Pardee | 188/71.6 X |
| 2,215,420 | 9/1940 | Eksergian | 188/264 A X |
| 2,655,236 | 10/1953 | Bachman | 188/71.6 X |
| 3,298,476 | 1/1967 | Day | 188/264 AA X |
| 3,312,414 | 4/1967 | Knapp | 188/71.6 X |

*Primary Examiner*—George E. A. Halvosa
*Attorneys*—Harry A. Herbert, Jr. and Arthur R. Parker ABSTRACT: An aircraft wheel disc brake rotor having a pair of disc members joined together by curved support rib elements mounted in raised relation on, and arranged to channel cooling air over the internal surfaces of the disc members. This cooling air, which is centrifugally directed by rotational movement of the disc members, is supplied through openings provided in either the rotor itself or in the rotor axle. The internal surface of each disc member is further fabricated with a series of grooves formed into a curvilinear ridge pattern that both provides a greater cooling surface area and ensures more efficient control and direction of the cooling air.

PATENTED SEP 7 1971 3,603,435
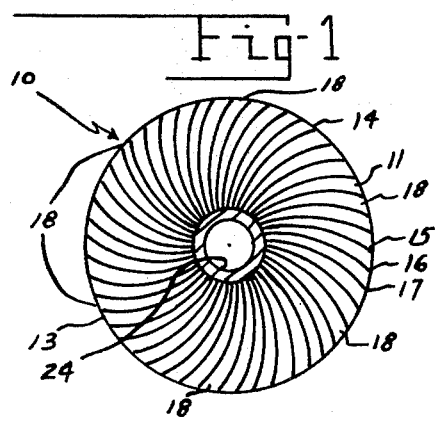
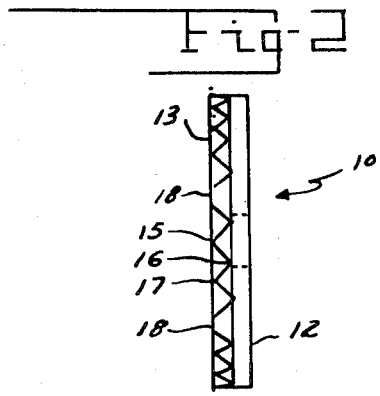
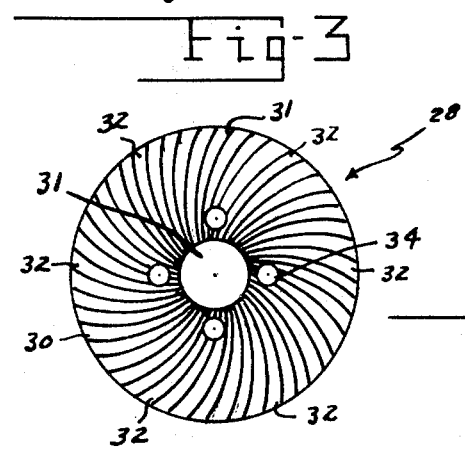
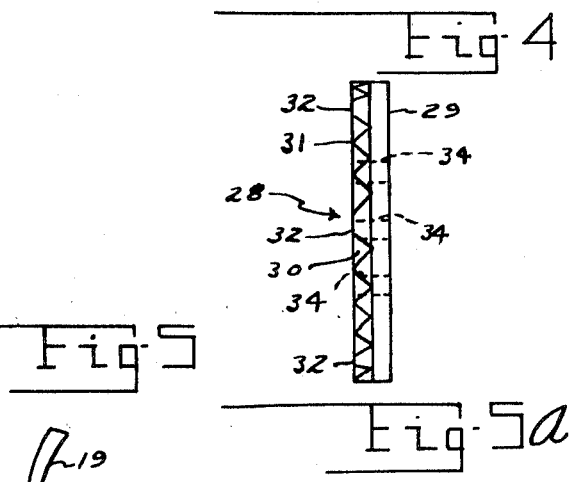
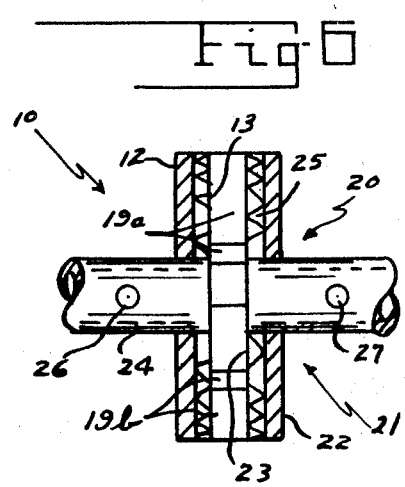
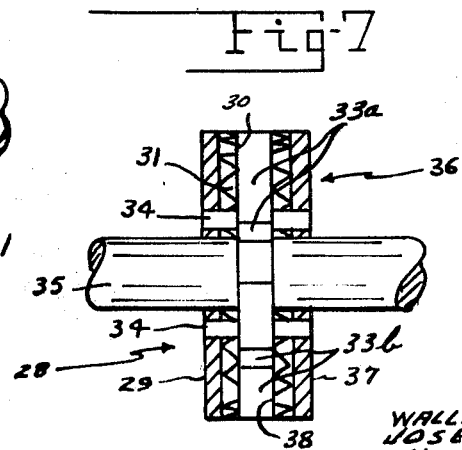
INVENTORS
WALLACE C. BUZZARD
JOSEPH E. KRYSIAK
BY Harry A. Herbert Jr
ATTORNEY
Arthur R. Parker
AGENT

3,603,435

AIR COOLED DISC BRAKE ROTOR

BACKGROUND OF THE INVENTION

This invention relates generally to the field of technology of aircraft wheel disc brake assemblies and, in particular, to an improved disc brake rotor assembly incorporating more efficient heat dissipation means.

A principal problem involved with previously oriented brake assemblies of the type of the present invention has been the relative inability to apply uniform brake pressure throughout the braking operation. This problem is due principally to the material reduction of the coefficient of friction of the braking surfaces occurring because of the relatively large increases in the temperatures of the braking surfaces inherent in other types of disc brakes. This problem is particularly acute in aircraft where relatively large braking loads are common. This increase in temperature naturally results in the phenomenon known as brake fade, which can be extremely hazardous. Therefore, it is self-evident that any means calculated to improve the dissipation of the heat of the brake disc-internal surfaces opposite from the external, braking surface will result in improved and more efficient brake operation. In this regard, the present invention eliminates or, at least, substantially reduces this problem in the unique manner to become readily apparent in the following summary and detailed description thereof.

SUMMARY OF THE INVENTION

The present invention consists briefly in joining together a pair of identical, but reversely oriented discs comprising the rotor subassembly of an aircraft wheel disc brake assembly by means of curved support ribs. The latter elements act to specifically direct cooling air over the internal surfaces of the said pair of discs. This cooling air, which may be initially supplied through openings in either the brake discs themselves or in the rotor assembly axle element, is directed or channeled by the aforesaid curved support ribs from the central portion of each disc in a direction outwardly towards the disc rim portions by the action of centrifugal force resulting from movement of the aircraft wheel in which mounted. Moreover, the internal surfaces of each rotor disc is grooved into a curvilinear ridge pattern configuration to thereby offer both a greater surface cooling area, and aid in facilitating the flow of air over the disc surfaces during the operation thereof.

Other advantages, as well as objects, of the invention will appear from the following disclosure of the invention, including the accompanying drawing, in which:

BRIEF DESCRIPTION OF THE DRAWING

FIG. 1 is a plan view of one form of rotor plate used with the present invention, illustrating details of the improved curvilinear ridge pattern formed on the internal surface thereof, and further showing the air intake openings therefor which may be provided in the center of the rotor assembly-axle member;

FIG. 2 is a side elevational view of the rotor plate of FIG. 1, but with the axle member thereof being omitted, and with additional details of the novel curvilinear ridge pattern of the present invention being illustrated thereby;

FIGS. 3 and 4, respectively, represent second, plan and side elevational views of a modified type of the rotor plate of the present invention, in which the air cooling means utilized therewith is shown provided through air inlet openings disposed in the plate itself at a position nearly adjacent to, and surrounding the rotor assembly-axle member;

FIGS. 5 and 5a respectively represent top and side elevational views of one of the air channeling rib elements forming an integral part of the present invention and adapted to be welded or otherwise joined to the internal surface of a respective pair of the inventive rotor plates comprising the improved rotor assembly;

FIG. 6 is a view, partly sectional and broken away, generally illustrating the rotor plate configuration of FIG. 1 formed into the pair of identical, but reversely oriented rotor plates comprising the improved rotor plate assembly of the present invention and, in particular, illustrating the condition of said assembly after the inventive air channeling rib elements have been joined thereto; and FIG. 7 is a second, partly sectional and broken away view, somewhat similar to that of FIG. 6, but generally illustrating the modified rotor plate of FIGS. 3 and 4, likewise, formed into the identical, but reversely oriented pair of rotor plates comprising the inventive rotor assembly.

DESCRIPTION OF THE PREFERRED EMBODIMENT

Referring generally to the drawing and, in particular, to FIGS. 1 and 2 thereof, one of the pair of novel rotor plates comprising the rotor subassembly of preferably an aircraft wheel disc brake assembly is indicated generally at 10 as including the disc element 11 which, in turn, incorporates a smooth face, external braking surface portion 12, and an internal, cooling or heat dissipating surface portion 13. Said internal surface portion 13 uniquely incorporates, or is fabricated with its entire face formed with a unique curvilinear ridge and groove pattern, as is indicated generally at the reference numeral 14. This pattern 14 consists of a series of arcuate lands or ridges, as at 15, and grooves, as at 16. Each of said arcuate grooves 16 is formed or encompassed by a corresponding pair of said lands or ridges, such as is denoted by the reference numerals 15 and 17, for example. This curvilinear ridge and groove pattern may be formed either by machining, forging, or by some other appropriate metal forming technique. In either event, with this improved curvilinear ridge and groove pattern 14, the flow of cooling air over the internal surfaces of the pair of rotor plates comprising the completed rotor plate subassembly is greatly facilitated. Moreover, this novel pattern offers a greater surface cooling area and, therefore, provides significantly increased heat dissipation to the rotor plate 10.

To ensure still further and more efficient cooling of the previously described rotor plate-disc element 11, a plurality of periodically spaced-apart and curved support ribs may be utilized. These ribs, hereinafter referred to as air channeling ribs, are indicated generally at 19a and 19b in FIG. 6 and, as indicated by their particular configuration shown in more detail at the reference numeral 19 in the plan and side elevation views of FIGS. 5 and 5a, respectively, they are designed to match the specific configuration of the previously noted ridges and grooves 15, 16 forming the inventive curvilinear ridge and groove pattern 14. To provide for the mounting thereto of the aforesaid matching air channeling ribs 19a, 19b, the internal surface portion 13 of the disc element 11 (Note FIG. 1) may be fabricated with a series of rib flat surface portions, indicated at 18 in FIGS. 1 and 2. These rib flat surface portions 18 may be made into an arcuate shape matching and therefore having the same configuration as the previously noted ridges and grooves 15 and 16. They are interspersed with said grooves and ridges at substantially regular intervals, as is clearly depicted in the drawing. The said air channeling ribs 19a, 19b may then be welded or otherwise joined in an integral-type relation between a pair of the inventive rotor plates, as will be hereinafter described with reference to the aforementioned FIG. 6.

As specifically illustrated in the above-noted FIG. 6, the complete rotor subassembly of the present invention is indicated generally at 20 as comprising a pair of opposed rotor plate members including the previously described rotor plate 10 (FIGS. 1 and 2), which may represent the left-hand plate member, and the rotor plate 21, which may represent the right-hand plate member of the opposed pair. In addition, the aforesaid pair of rotor plate members 10, 21 may be suitably mounted on a stub shaft or rotor assembly-axle member means, such as is indicated at the reference numeral 24 (Note FIGS. 1 and 6). Again, as previously mentioned, said rotor plate members 10, 21 may be joined to each other by means of the previously disclosed, plurality of air channeling ribs, as at 19a and 19b, which are interconnected therebetween and welded or otherwise affixed thereto. As in the case of the said left-hand rotor plate member 10, opposed right-hand rotor plate member 21, of course, also incorporates a smooth face, external braking surface portion 22, and an internal, cooling or heat dissipating surface portion 23, likewise having a curvilinear ridge and groove pattern indicated generally at 25, which is identical to that illustrated at 14 in FIG. 1.

With the above-described unique curvilinear ridge and groove pattern arranged on the internal surface portions 13 and 23, respectively, of left and right-hand rotor plate members 10 and 21, a considerably increased cooling airflow is assured thereover to thereby more uniformly control the temperature of the external braking surface portions 12, 22 of said rotor plate members. Further and more effective cooling results from the use of the previously noted curved and matching air channeling ribs 19a, 19b, which support and join together the said two rotor plate members 10, 21, as has been previously explained. These air channeling ribs 19a, 19b operate to direct or channel cooling air over the internal surfaces of said rotor plate members 10, 21 in a direction from the center of said plates outwardly to the respective rims thereof through the action of centrifugal force when the aircraft wheel, in which they are mounted, is in motion. In this connection, since the aircraft wheel axle, such as the previously mentioned axle member means 24 (FIG. 6), may be made of hollow tubular construction, and the rotor plate members 10 and 21 may be easily made with a hole in their centers, cooling air may enter through an air inlet hole or opening formed in the said axle member means 24, as for example that indicated at either 26 and/or 27 in FIG. 6, from whence it may then flow through the opening or passageway in the hollow tube portion of the said axle member means 24 and from there subsequently enter into the center space between the joined rotor plate members 10 and 21. The previously described outward flow of the said cooling air through centrifugal action will thereafter occur during rotation of the aircraft wheel. Of course, this outward cooling airflow is then uniquely directed by means of the novel air channeling ribs 19a, 19b across the internal, cooling or heat dissipating surfaces 13 and 23 of the plate members 10, 21 by way of the already described unique curvilinear ridge and groove patterns 14, 25 thereof.

An alternate method of introducing the cooling air into the center space between the joined rotor plate members 10, 21, is illustrated in FIGS. 3, 4 and 7. In FIGS. 3 and 4, for example, the inventive rotor plate member is indicated generally at 28 as consisting of a smooth face-external braking surface side portion 29 (Note FIG. 4), and an internal, cooling or heat dissipating surface side portion at 30. Again, the entire face of the latter side portion 30 is made, as in the case of the inventive form disclosed in FIG. 1, for example, with the curvilinear ridge and groove pattern, indicated generally at 31, which is identical to that indicated at 14 in the aforesaid FIG. 1. Also, a plurality of flattened surfaces indicated at 32, are incorporated on the aforementioned internal surface side portion 30 between appropriately positioned ridges and grooves formed thereon. Again, in this form of the invention, air channeling ribs, such as indicated at 33a and 33b in FIG. 7, which are identical to that previously indicated at 19 in FIGS. 5 and 5a, may be welded or otherwise affixed to each of said flattened surfaces 32. Instead of admitting cooling air through an opening in the axle member means, as at 24 in FIGS. 1 and 6, a plurality of relatively small air inlet openings or holes may be incorporated directly in the rotor plate member 28 itself, as is seen at 34 in the aforesaid FIGS. 3 and 4. Air inlet openings 34 are shown as being positioned in said rotor plate member 28 substantially adjacent to, and circumferentially disposed around, the axle member means at 35, which in this inventive form, may be made of a solid configuration.

As previously described for the rotor plate member 10 of FIG. 6, rotor plate member 28 constitutes the left-hand element of a pair of such rotor plate members which includes the right-hand rotor plate member 36 shown in FIG. 7. Once again, member 36 incorporates an external, smooth face braking side 37, and an internal, cooling or heat dissipating surface side at 38. Furthermore, internal surface side incorporates the same unique curvilinear ridge and groove pattern of the present invention previously described for the inventive form of FIGS. 1 and 6. To complete the overall rotor assembly, the aforementioned air channeling ribs 33a, 33b are utilized to weld together or otherwise join and support said pair of rotor plate members 28 and 36. To support said air channeling ribs 33a, 33b, the latter may be welded or otherwise joined to the previously mentioned flattened surfaces 32 which may be integrally formed on the internal surfaces of said rotor plate members 26 and 36. Again, cooling of the internal surface side portions 30, 38, respectively, of the members 28 and 36 is effected by the built-in action of said curved air channeling support ribs 33a and 33b directing or channeling cooling air thereover. Of course, the curvilinear ridge and groove patterns formed on each rotor plate-internal surface side portion 30, 38 performs its twofold function, as previously noted; namely, it uniquely offers a considerably increased surface cooling area for the rotor plates 28, 36, and, in addition, significantly facilitates the flow of air over the said surfaces while the aircraft wheel is in motion.

Although the present wheel disc brake rotor was specifically described with reference to aircraft braking operations, it is actually of more general applicability and, therefore, may be incorporated in the braking operations of other types of vehicles and mechanisms without departing from the true spirit or scope of the invention. In this connection, the novel curvilinear ridge and groove pattern of the instant invention, which constitutes a unique and simplified built-in braking surface-cooling means, offers the further advantage of minimizing the amount of eddying present and thereby removes the heat conduction losses more rapidly. In this manner, the brake surface temperatures are maintained at more moderate levels and the friction coefficient of such surfaces vary a minimum amount only because of the improved built-in cooling and heat dissipating means provided by the present invention.

We claim:

1. In a wheel brake assembly, a brake rotor subassembly comprising; a pair of substantially identical, and opposed and reversely oriented axially spaced rotor plate members; and hollow shaft-support means extending outwardly and coaxially from said plate members but discontinuous between said plate members and openings in said shaft means located axially outside said plate members for admitting air to the inside of said hollow shaft and thence through the discontinuity to the space between the plate members; each of said rotor plate members having a smooth-faced, external, brake-applying surface on the side thereof facing outwardly away from the other of said rotor plate members, and an internal, heat-dissipating surface on the side thereof facing inwardly towards the other of said rotor plate members; each of said internal, heat-dissipating surfaces being configured across the entire face thereof with a series of closely spaced, arcuate-shaped grooves; and a plurality of equally spaced, arcuate shaped, air channelling ribs extending between and attached to said heat dissipating surfaces, said ribs acting together with said grooves to centrifugally pump air from said hollow shaft across said heat dissipating surfaces.